Dec. 7, 1954 H. D. WALLIN 2,696,404
HYDRAULICALLY OPERATED MECHANISM FOR DUMPING TRUCK BODIES
Filed May 11, 1950 3 Sheets-Sheet 1
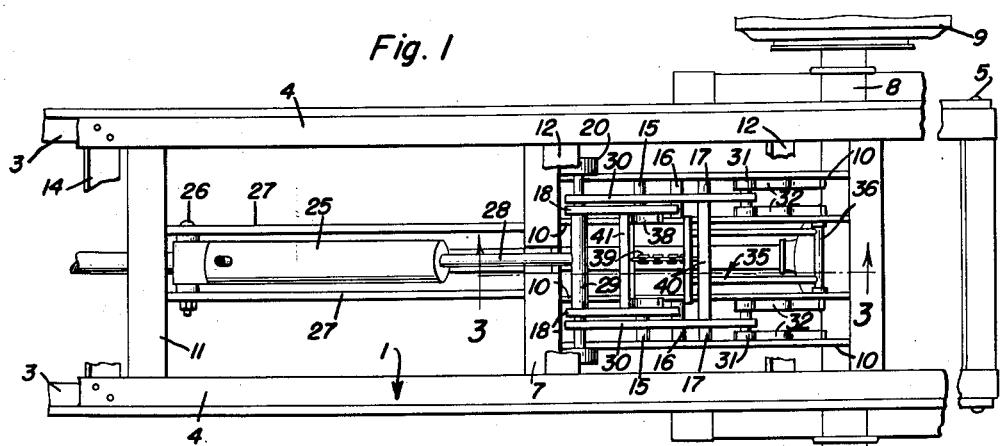
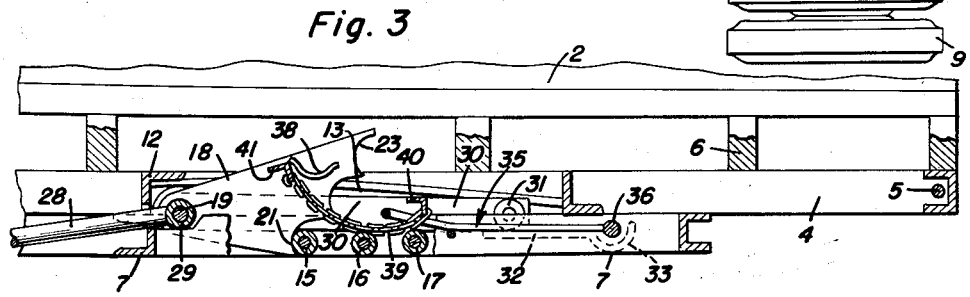
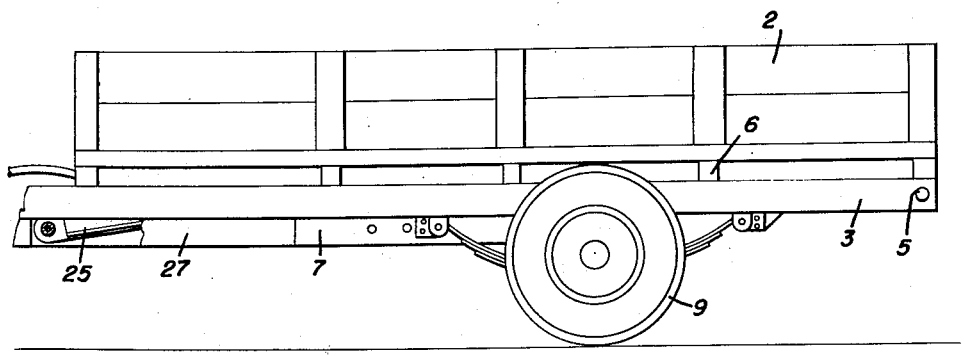
Inventor
Howard D. Wallin

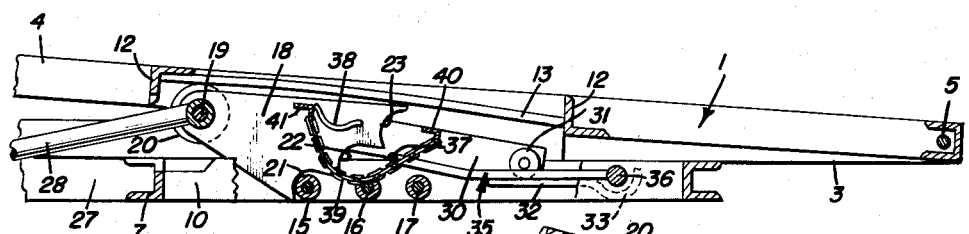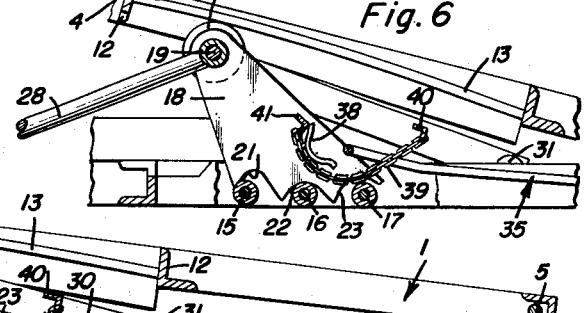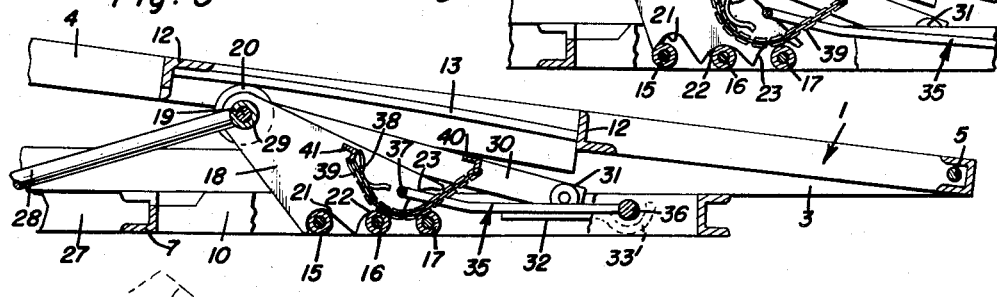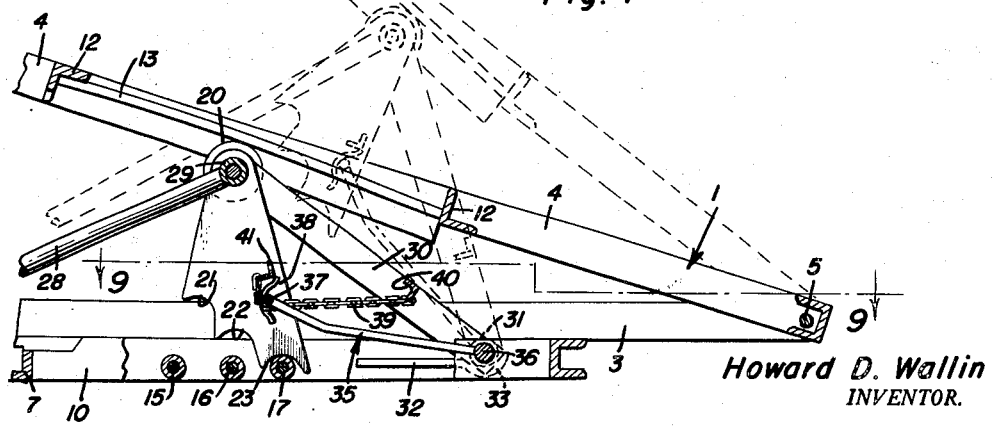

Dec. 7, 1954  H. D. WALLIN  2,696,404
HYDRAULICALLY OPERATED MECHANISM FOR DUMPING TRUCK BODIES
Filed May 11, 1950  3 Sheets-Sheet 3
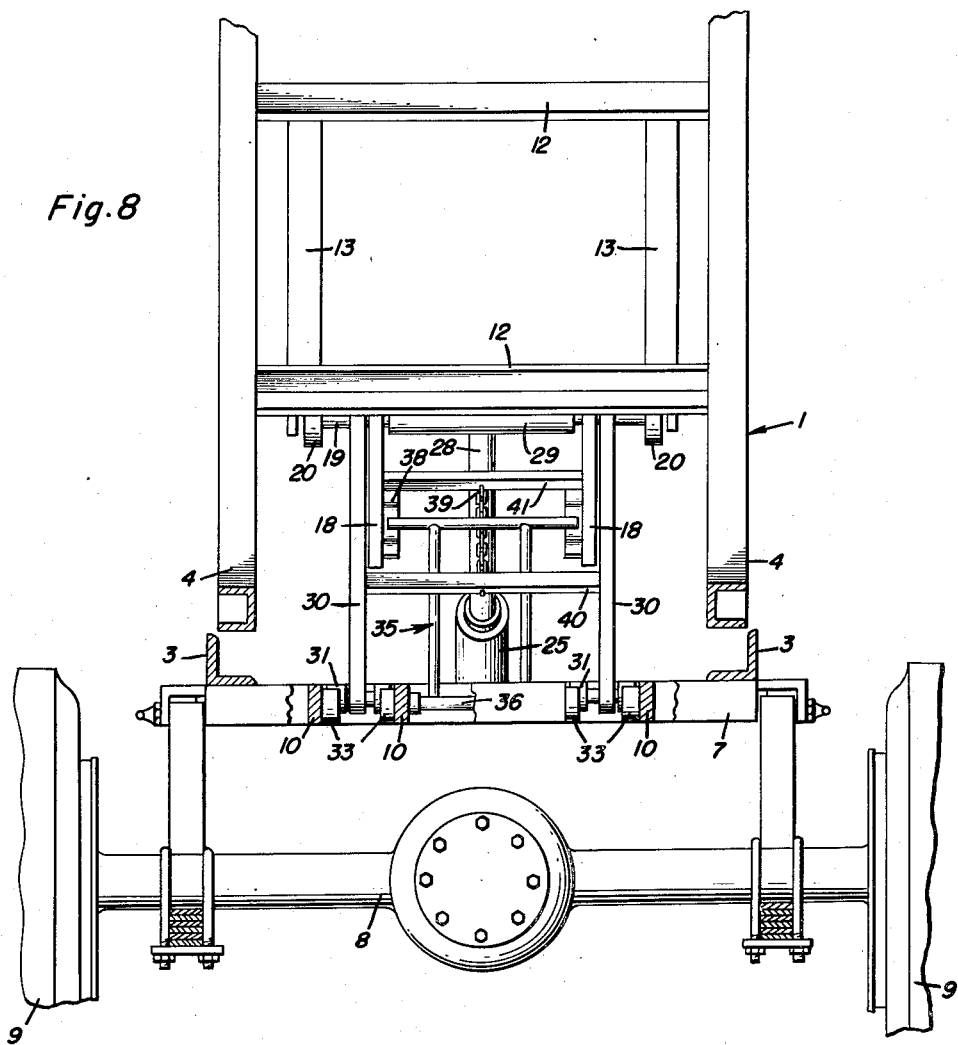
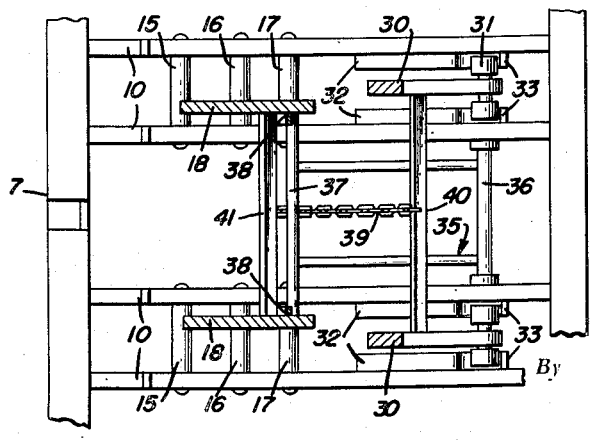
Inventor
Howard D. Wallin

United States Patent Office 2,696,404
Patented Dec. 7, 1954

2,696,404

HYDRAULICALLY OPERATED MECHANISM FOR DUMPING TRUCK BODIES

Howard D. Wallin, Marcus, Iowa

Application May 11, 1950, Serial No. 161,285

5 Claims. (Cl. 298—22)

My invention relates to improvements in hydraulically operated mechanism for dumping box bodies of automotive trucks.

The primary object of the invention is to provide for lifting and dumping a truck body by leverage applied, by operation of a comparatively small hydraulic cylinder, but so that heavily loaded truck bodies may be dumped with the body at a maximum angle to the horizontal.

Another object is to provide mechanism of the character and for the purpose set forth which may be embodied in present-day automotive trucks without materially altering the basic structure of the truck.

Still another object is to provide heavy-duty mechanism for the purpose specified which is simple in construction, safe, not liable to get out of order, and inexpensive to manufacture and install.

Other and subordinate objects, within the purview of my invention, together with the precise nature of my improvements, will be readily understood when the succeeding description and claims are read with reference to the drawings accompanying and forming a part of this specification.

In said drawings:

Figure 1 is a fragmentary view in plan partly broken away of an automotive truck embodying my improved hydraulically operated mechanism, the truck body being removed for clearness of illustration and the parts being shown in normal position for lifting the truck body from normal position;

Figure 2 is a fragmentary view in side elevation drawn to a smaller scale and partly broken away with the body lowered;

Figure 3 is a view in longitudinal section taken on the irregular line 3—3 of Figure 1 and drawn to a larger scale with parts broken away;

Figure 4 is a similar view illustrating the operation of the mechanism at the beginning of the first stage of operation;

Figure 5 is a similar view illustrating operation of the mechanism at the end of the first stage of operation;

Figure 6 is another similar view illustrating operation of the mechanism during the second stage of operation;

Figure 7 is still another similar view illustrating in full lines operation of the mechanism at the end of the third stage of operation, and further illustrating, in broken lines, the fourth stage of operation of the mechanism;

Figure 8 is a view partly in rear elevation and partly in vertical transverse section illustrating, in full lines, the fourth stage of operation of the mechanism and drawn to a larger scale; and Figure 9 is a detail view in horizontal section taken on the line 9—9 of Figure 7.

Referring to the drawings by numerals, according to my invention, a body dumping frame 1 for the usual box body 2 of an automotive truck is provided to fit in substantially horizontally normal position, when the body 2 is lowered, between the chassis frame side bars 3 of the truck to rest on said bars 3 which are of the usual angle iron form. The frame 1 comprises longitudinal side bars 4 pivoted at rear ends thereof, as at 5, to the rear ends of the chassis frame side bars 3 for vertical swinging movement of said frame 1. Bolster bars 6 on the dumping frame 1 support the body 2.

A rectangular sub-frame 7 connects the chassis frame side bars 3 below the same and extends forwardly from over the rear axle housing 8 for the axles of the rear wheels 9, said sub-frame 7 comprising a pair of longitudinal side rails 10 on each side of the longitudinal center of the chassis frame. A cross-bar 11 in front of the said sub-frame 7 also connects the chassis frame side bars 2.

A track frame 12 overlying the sub-frame 7 connects the side bars 4 of the dumping frame 1 and embodies a pair of longitudinal track rails 13 adjacent opposite sides of said dumping frame 1. A bar 14 also connects the side bars 4 of the dumping frame 1.

Suitably journaled between the side rails 10 of each pair, forwardly of the transverse center of the sub-frame 7, is a series of three cross-rollers aligned transversely of the sub-frame 7 to form front, intermediate and rear pairs 15, 16, 17 in which the rollers in each pair are located upon opposite sides of the longitudinal center of the dumping frame 1 well forward of the pivotal axis of said frame, for a purpose presently seen. The pairs of rollers 15, 16, 17, as best shown in Figure 9, are spaced apart laterally longitudinally of the dumping frame 1 equidistantly, and for a purpose presently clear.

A pair of hydraulically operated vertical rockers 18 are provided upon opposite sides of the longitudinal center of the dumping frame 1 for rolling action on the pairs of rollers 15, 16, 17 successively, and on the track rails 13 whereby to lift said frame 1 and tilt the body 2 upwardly and rearwardly by three stages of operation in which said body 2 is thus tilted at successively greater angles to the horizontal. For this purpose, the rockers 18 are V-shaped with apex ends cross-connected by a tie rod 19 having end rollers 20 for rolling rearwardly along the track rails 13 beneath said rails to lift and support the dumping frame 1. The larger end of each rocker 18 is provided with a series of three front, intermediate and rear notches 21, 22, 23 arranged in stepped formation and spaced successively greater distances from the apex ends of the rocker.

In the normal lowered position of the dumping frame 1, and body 2, the rockers 18 are swung downwardly and forwardly into normal position, as best shown in Figure 3, with the front notches 21 straddling and engaging the front pair of rollers 21, and the intermediate and rear notches 22, 23 spaced above the intermediate and rear pairs of rollers 16, 17. From this position, the rockers 18 are designed to be rocked upwardly and rearwardly whereby the rollers 20 will be correspondingly moved along the track rails 13 to lift the dumping frame 1 on its pivots 5 and incline the body 2 rearwardly and downwardly for dumping out of the rear end thereof, in the usual manner.

Hydraulic means is provided for rocking the rockers 18 upwardly and rearwardly comprising an hydraulic cylinder 25 extending longitudinally midway between the chassis frame side bars 3 with a rear end pivoted, as at 26, between longitudinal bars 27 forming part of said chassis frame, the cylinder being vertically swingable on said pivot 26 for a purpose presently clear. A piston rod 28 extending out of the front end of the cylinder 25 carries a cross-head 29 of tubular form rotatable on the tie rod 19 between the rockers 18, and whereby said piston rod is operatively connected to said rockers. As will be seen, in Figure 3, in the normal position of rockers 18, the cylinder 25 and piston rod 28 incline upwardly and rearwardly toward the tie rod 19 out of dead center relation to the series of rollers 15, 16, 17 so that said rockers 18 cannot assume a dead-center position. Any suitable means may be utilized for introducing hydraulic pressure into the rear end of the hydraulic cylinder 25 for advancing the piston rod 28, and for releasing such pressure to permit said rod 28 to retract.

Referring, at this point, to the operation of the invention, as so far described, with the rockers 18 and the dumping frame 1 and body 2 in the described normal position, upon initial advance of the piston rod 28, the rockers 18 will be swung upwardly and rearwardly, as shown in Figure 4, with the front notches 21 fulcruming on the front pair of rollers 15 until the intermediate notches 22 engage the intermediate pair of rollers 16, as shown in Figure 5. The rollers 20 rolling along the track rails 13 will lift the dumping frame 1 on its pivot to incline the body 2 downwardly and rearwardly by a first stage of operation, at an angle to the horizontal, such as shown in Figure 5. Further advance of the piston rod 28 will now rock the rockers 18 further rearwardly with the intermediate notches 22 fulcruming on the intermediate pair of rollers 16, as shown in Figure 6, until the rear notches 23 engage the rear pair of rollers 17. The dumping frame 1 will thus be further lifted to further incline the body 2 by a second stage of operation. Further advance of the piston rod 28 will swing the rockers 18 further rearwardly with the rear notches 23 fulcruming on the rear pair of rollers 17 so that when the tie rod 19, and rollers 20, approach near vertical alignment with the rear pair of rollers 17, the dumping frame 1 will have been still further lifted to further incline the body 2 by a third stage of operation, and as shown in Figure 7.

In addition to the rockers 18, means is provided for lifting the dumping frame 1 further to incline the body 2 further through a fourth stage of operation, and which will now be described.

A pair of rocker levers 30, longer than the rockers 18, are pivoted at front ends thereof on the tie rod 19, upon opposite sides of the pair of rockers 18, and which extend, normally, rearwardly from said tie rod. Pairs of rollers 31 are provided on the rear ends of the rocker levers 30 to run along horizontal pairs of laterally spaced tracks 32 on the side rails 10, and whereby the rear ends of the rocker levers 30 are movable rearwardly, horizontally, and supported during rearward swinging of the rockers 18 upwardly. Stop sockets 33 on the rear ends of the tracks 32 seat the rollers 31 and limit rearward movement of the rear ends of the rocker levers 30 at the end of the third stage of operation of the body 2. Normally, the rocker levers 30 lie horizontally on the rollers 15, 16, 17 and rest on said pairs of rollers 15, 16, 17 to establish the normal starting position of the rockers 18 on the front pair of rollers 15.

During rearward swinging of the rockers 18, the rocker levers 30 move idly rearwardly along the tracks 32, but, when the third stage of operation of the body 2 is completed, and as shown in Figure 7, the rollers 31 seat in the sockets 33 and stop further rearward movement of said levers 30. At this point, the rocker levers 30, if the piston rod 28 is still further projected, fulcrum on the seated rollers 31 and cause the dumping frame 1 to be lifted and the body 2 further inclined in a fourth stage of operation, all as shown in broken lines in Figure 7.

As will be observed in Figure 7, during the described fourth stage of operation of the body 2, the rockers 18 are lifted bodily above the front, intermediate and rear pairs of rollers 15, 16, 17 in pendant position. Obviously, when the body 2 is lowered to normal position, the rockers 18 must rock forwardly on the rear, intermediate and front pairs of rollers 17, 16, 15, successively, to position said rockers in normal position. Therefore, during initial lowering of the body 2, after the fourth stage of operation, the rockers 18 must be guided during lowering thereof to position the rear notches 23 on the rear pair of rollers 17. For this purpose, a stop bail 35 is pivotally mounted in the sub-frame 7 in the rear of the rockers 18 for vertical swinging movement, the pivotal mounting comprising a cross-rod 36 journaled between the pairs of side rails 10 in the inner rails of the pairs. The stop bail 35 comprises a front cross-rod 37 adapted, when the rockers 18 are swung rearwardly into nearly vertical position, to enter concave stop ribs 38 on said rockers and limit rearward swinging of the rockers. During the fourth stage of operation of the body 2, the stop bail is swung upwardly and rearwardly, from a normal lowered position, by said stop ribs 38, as shown in broken lines in Figure 7, to maintain the rockers 18 in a position such that said rockers cannot swing rearwardly on the tie-rod 19 while pendent.

As will, of course, be understood, the body 2, dumping frame 1, rockers 18 and the rocker levers 30 assume normal position under the influence of gravity when the piston rod is retracted by the weight of the body 2 and after release of pressure in the hydraulic cylinder 25.

A chain 39 is attached at one end to a cross-bar 40 fixed to and between the rocker levers 30 and is trained under the front cross-rod 37 of the stop bail 35 and its other end attached to a cross-bar 41 fixed to and between the rockers 18 intermediate the pair of stop ribs 38 and the tie rod 19, the arrangement being such that when the rocker levers 30 swing to lift the body 2 through the fourth stage of operation, said chain 39 is tightened to prevent forward swinging of said rockers 18 on the tie-rod 19, thereby maintaining the cross-rod 37 seated in the stop ribs 38 and the rockers 18 in position to engage the rear notches 23 with the rear pair of rollers 17 when the body is initially lowered after the fourth stage of operation.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. The combination with the chassis frame of a truck having a dump body, of a body dumping frame supporting said body and pivoted on said chassis frame for vertical swinging to incline said body, an hydraulic cylinder pivoted on said chassis frame for vertical swinging and having a piston rod for advance out of the cylinder, laterally spaced longitudinal track rails on said dumping frame, a pair of coaxial rollers carried by said piston rod for rolling along and beneath said track rails as said piston rod is advanced, means for raising said rollers step by step as the piston rod is advanced whereby to cause said rollers to swing said dumping frame upwardly into successively higher inclined positions comprising a pair of rockers carried by said piston rod for vertical swinging about the axis of said rollers and having stepped ends, rollers on said chassis frame in a common plane parallel with the plane of said chassis frame and on which the stepped ends of the rockers fulcrum during vertical swinging of said rockers, and means operative by advance of said piston rod to raise said pair of rollers an additional step after raising of the same by said first-mentioned means comprising a fulcrumed lever pivotally connected to said piston rod and movable idly thereby during raising of said rollers by said first named means.

2. The combination with the chassis frame of a truck having a dump body, of a body dumping frame supporting said body and pivoted on said chassis frame for vertical swinging to incline said body, a longitudinal track mounted on said body frame, a sub-frame mounted on said chassis frame, a series of rollers mounted in said sub-frame in a common plane parallel with the plane of said chassis frame, a vertically swingable elongated rocker having a stepped end rocking onto said rollers successively to lift said rocker endwise through successive stages, means on the other end of said rocker for riding said track and swinging said body supporting frame upwardly at each stage of lift of said rocker, power means for swinging said rocker including an upwardly swingable piston rod connected to said rollers, and means to lift said rocker above said rollers after said stages of lift of said rocker to further swing said body supporting frame upwardly comprising a second track on said sub-frame, a lever pivotally connected at one end to said piston rod for movement bodily thereby with its other end riding said track idly during said stages of lift of said rocker, and a socket in said second track in which said other end of said lever seats and fulcrums after idle movement of said lever.

3. The combination with a chassis frame of a truck having a dump body, and a body dumping frame supporting said body and pivoted on said chassis frame for vertically swinging to variably incline said body, series of rollers mounted on said chassis frame in successive pairs spaced longitudinally of said chassis frame, a pair of rockers swingable vertically on the successive pairs of rollers in succession with a fulcruming action to swing said dumping frame into successively higher inclined positions, fluid pressure means for swinging said rockers, and lever means having a pivotal connection to said pressure means slidable on the dumping frame and a pivot sliding in limited degree on said chassis frame for swinging said dumping frame into a still higher inclined position after being swung into said successive higher inclined positions, the pivot of said lever means being slidably mounted for limited sliding of said lever means to render the same idle during swinging of said dumping frame into said successively higher inclined positions.

4. The combination with the chassis frame of a truck having a dump body, and a body dumping frame supporting said body and pivoted on said chassis frame for vertical swinging to incline said body, an hydraulic cylinder pivoted on said chassis frame for vertical swinging and having a piston rod for advance out of the cylinder, a pair of rockers operative by said piston rod to swing said dumping body into successively higher inclined positions, and lever means having a pivotal connection to said piston rod sliding on the dumping frame and a pivot slidable in limited degree on said chassis frame for swinging said dumping frame into a still higher inclined position after being swung into said successive higher inclined positions, and connections between said lever means and rockers preventing rocking of said rockers while said dumping frame is being swung into said still higher position.

5. The combination of the chassis frame of the truck having a dump body, the body dumping frame supporting said body and pivoted on said chassis frame for vertically swinging to incline said body, an hydraulic cylinder pivoted on said chassis frame for vertical swinging and having a piston rod for advance out of the cylinder, laterally spaced longitudinal track rails on said dumping frame, a pair of coaxial rollers carried by said piston rod for rolling along and beneath said track rails as said piston rod is advanced, means for raising said rollers step-by-step as the piston rod is advanced thereby to cause said rollers to swing said dumping frame upwardly into successively higher inclined positions comprising a pair of rockers carried by said piston rod for vertical swinging about the axis of said rollers and having stepped ends, rollers on said chassis frame on which the stepped ends of the rockers fulcrum during vertical swinging of said rockers, and means operative by advance of said piston rod to raise said pair of rollers an additional step after raising of the same by said first named means comprising a lever pivotally connected at one end to said piston rod and having limited pivotal sliding movement at its other end for movement idly by said piston rod during raising of said pair of rollers by said first named means.

References Cited in the file of this patent

UNITED STATES PATENTS

| Number | Name | Date |
|---|---|---|
| 1,694,909 | Barrett | Dec. 11, 1928 |
| 1,726,797 | Barrett | Sept. 3, 1929 |
| 1,904,345 | Anthony et al. | Apr. 18, 1933 |
| 1,943,050 | Beath | Jan. 9, 1934 |
| 2,097,555 | Anthony | Nov. 2, 1937 |
| 2,136,663 | Anthony | Nov. 15, 1938 |
| 2,488,790 | Wood | Nov. 22, 1949 |

FOREIGN PATENTS

| Number | Country | Date |
|---|---|---|
| 636,666 | France | Jan. 14, 1928 |
| 72,519 | Sweden | Mar. 19, 1930 |